B. C. RIBLET.
STEERING AND CRANKING MECHANISM FOR MOTOR DRIVEN VEHICLES.
APPLICATION FILED NOV. 13, 1909.
965,014.
Patented July 19, 1910.
2 SHEETS—SHEET 1.
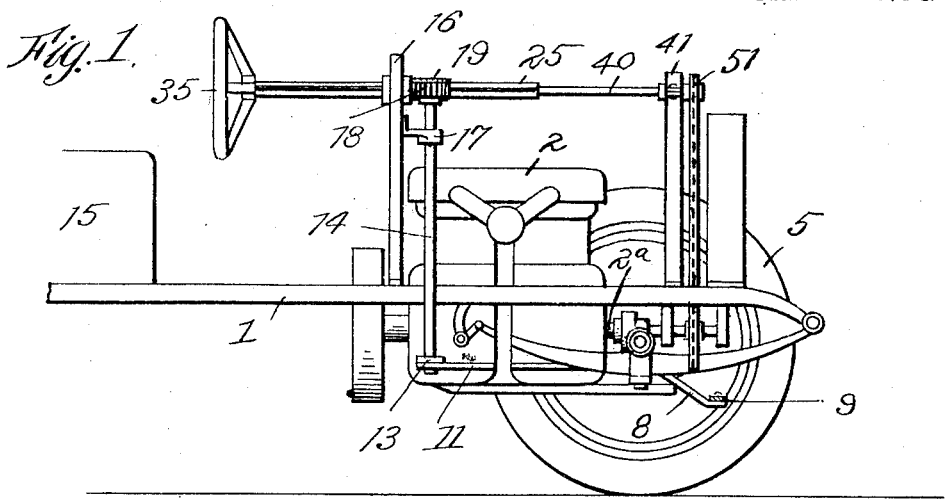
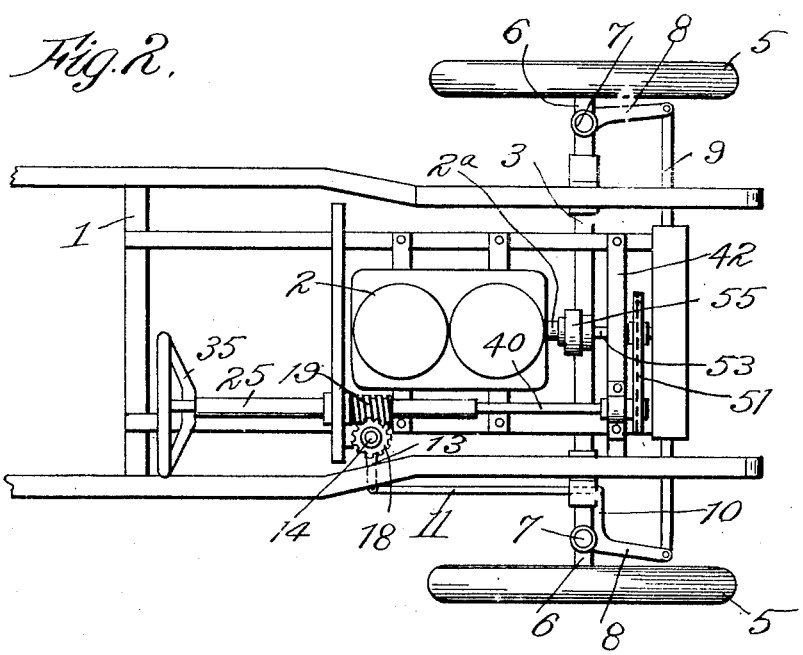
Witnesses:
Ray J. Ernst.
Byron C. Riblet
Inventor
By his Attorneys B. C. RIBLET.
STEERING AND CRANKING MECHANISM FOR MOTOR DRIVEN VEHICLES.
APPLICATION FILED NOV. 13, 1909.
965,014.
Patented July 19, 1910.
2 SHEETS—SHEET 2.
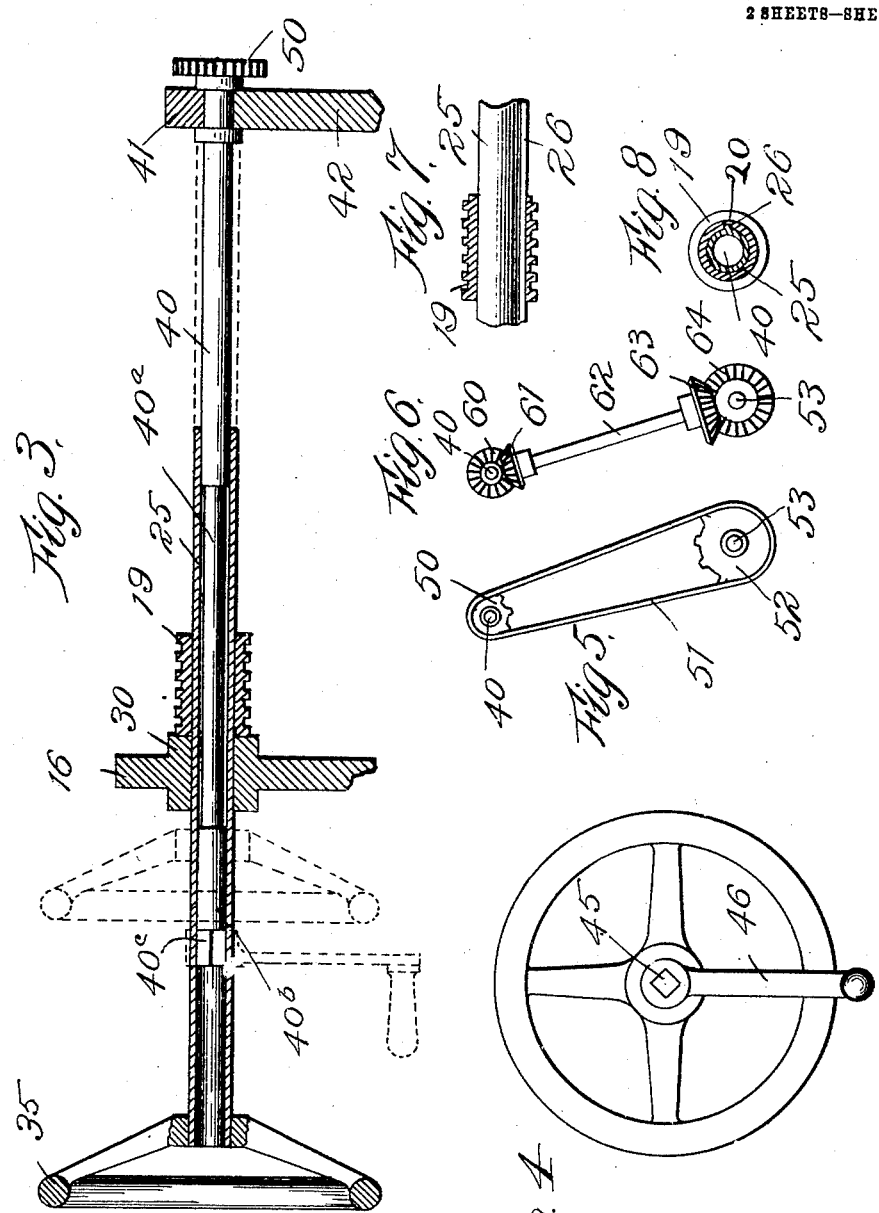

UNITED STATES PATENT OFFICE.

BYRON C. RIBLET, OF NEW YORK, N. Y.

STEERING AND CRANKING MECHANISM FOR MOTOR-DRIVEN VEHICLES.

965,014.  Specification of Letters Patent.  Patented July 19, 1910.

Application filed November 13, 1909. Serial No. 527,838.

*To all whom it may concern:*

Be it known that I, BYRON C. RIBLET, a citizen of the United States, and resident of the borough of Manhattan, city, county, and State of New York, have invented certain new and useful Improvements in Steering and Cranking Mechanism for Motor-Driven Vehicles, of which the following is a specification.

My present invention, which relates to cranking and steering mechanism for motor driven vehicles of the gas engine type, has for its objects, first, the production of a more convenient arrangement of engine cranking device to permit the cranking of the engine from the car and avoid the disagreeable feature of cranking the engine from the ground; second, a more convenient arrangement of steering gear to facilitate the entrance and exit from the vehicle; and third, the production of a combined cranking and steering mechanism having the above stated advantages, and the further advantages of simplicity and compactness.

In order that my invention may be fully understood, I will first describe the same with reference to the accompanying drawings and afterward point out the novelty more particularly in the annexed claims.

In said drawings, Figure 1 is a side elevation of the forward part of a motor driven vehicle having my improvements applied thereto. Fig. 2 is a plan view of the same. Fig. 3 is an enlarged detail vertical longitudinal sectional view, showing the telescoping engine crank shaft and steering post. Fig. 4 is a detail end view of the same, looking at the crank and steering wheel. Fig. 5 is a detail front view illustrating one form of driving connection between the cranking shaft and the engine crank shaft. Fig. 6 is a similar view of a modified form of said driving connection. Fig. 7 is a detail longitudinal sectional view, and Fig. 8 is a detail transverse sectional view showing the connection between the extensible steering post and one of the steering gears.

For the purpose of illustrating my invention, I have shown more or less diagrammatically the forward part of a motor driven car in which the chassis 1 of any suitable construction supports a gas engine 2 of any suitable type and is itself mounted upon the car axles of which the front axle 3 is shown. The gas engine 2 is mounted in vertical position with its horizontal crank shaft $2^a$ extending longitudinally of the car in the usual manner. The front wheels 5 of the car are journaled as usual upon the axle trunnions 6 which have knuckle joints 7 with the front axle 3. Arms 8 are rigidly connected with the axle trunnions 6 and project forwardly therefrom and are connected at their front ends by a cross rod 9 which insures the uniform turning of the steering wheels of the car in the usual manner.

Formed integral with or otherwise rigidly connected to one of the arms 8 or one of the axle trunnions 6 is a controlling arm 10 having pivotally connected with it a rearwardly extending rod or pitman 11 pivoted at its rear end with the free end of a rock arm 13 rigidly attached to a vertical intermediate steering shaft 14 suitably journaled in the chassis and car body.

15 represents the driver's seat.

16 represents the dash-board or a part of the dash frame.

The intermediate steering shaft 14 has one of its bearings at 17 in front of the dash 16. Keyed to the upper end of the shaft 14 is a worm wheel 18 which is in constant mesh with a worm 19 formed with a longitudinal spline groove 20. This worm wheel 19 is mounted upon a longitudinally extensible hollow steering post 25 having a horizontal spline or rib 26, so that the steering post 25 can be removed longitudinally through the worm 19 and at the same time cause said worm 19 to rotate with it. This hollow steering post 25 is supported in horizontal position upon the car and extends through the main bearing 30 of the dash-board 16. Secured to the rear end of the hollow steering post 25 is the steering wheel 35, which is presented in convenient position in front of the driving seat 15 when the steering post 25 is drawn out or extended longitudinally, and which is presented against or close to the dash-board 16 when the steering post 25 is retracted or moved into its contracted position. The first of these positions is shown in Figs. 1 and 2, and full lines in Fig. 3, and is the position maintained while the car is being operated. The second of these positions is shown in dotted lines in Fig. 3, and is the position of the steering post and wheel when the car is not being operated, and it is desired to afford ample room for the entrance and exit to and from the car. This rearward position of the steering post and wheel is necessary for the operation of the cranking device which will now be described.

The cranking shaft 40 is journaled at its forward end in a bearing 41 in the upper end of a suitable support 42 extending from the car chassis. The shaft 40 extends into the tubular steering post 25 to a point in rear of dash 16, it being reduced in diameter for about one-half its length toward its rear end as indicated at 40ª to reduce the friction between shaft 40 and tubular steering post 25. This reduction of the diameter of shaft 40 provides the forward end of the shaft as a bearing for the forward end of the tubular steering post, and a small section 40ᵇ at the rear end of the shaft as a rear bearing for the post 25, and for the shaft 40. The extreme rear end of the cranking shaft 40 is squared as shown at 40ᶜ to receive the squared socket 45 of a removable crank 46.

It will of course be understood that I may provide a shaft and removable crank with any other suitable engaging means.

At its forward end, the shaft 40 is provided with a sprocket wheel 50 which operates a sprocket chain 51 which operates over a sprocket wheel 52 keyed to a shaft 53 alined with the engine crank shaft 2ª and detachably connected therewith by means of any suitable automatic clutch 55, the structure of which is not disclosed but which is designed to automatically free shaft 53 from the engine crank shaft 2ª when the engine is running, and to automatically couple up said shafts when the engine is at a standstill and the shaft 53 is driven for cranking the engine.

As shown in Fig. 6, the gearing between the cranking shaft 40 and the clutch shaft 53 of the engine may consist of a bevel gear 60 upon shaft 40 meshing with a similar bevel gear 61 keyed to the upper end of an inclined shaft 62 carrying at its lower end a bevel gear 63 which meshes with a similar bevel gear 64 upon the shaft 53. In both of these forms of gearing between shafts 40 and 53, it will be observed that they are in the proportion of one to two for the purpose of producing a single rotation of the engine crank shaft for two revolutions of the cranking shaft.

It will be observed that the steering post 25 and cranking shaft 40 are mounted coaxially and telescoped to produce a simple and compact structure, said parts serving to mutually support each other, without interfering with their functions. When it is desired to crank the engine with my improved arrangement, the steering post is moved into forward position to bring the steering wheel 35 close against the rear face of the dash-board and permit the squared end of the cranking shaft 40 to project sufficiently far beyond the steering post and wheel for the mounting of the crank 46. When the crank is in place, the engine can be cranked from the floor of the car, two revolutions of the crank causing one revolution of the engine crank shaft, thereby reducing the manual effort and placing the crank in the most convenient position to overcome the compression point of the engine crank shaft. When the engine has started, the crank 46 is removed from the cranking shaft 40 and the operator takes his seat and draws the steering wheel toward him into convenient position for operating the car.

The advantages of my improved construction, aside from its simplicity and compactness, reside in the provision for cranking the engine while in the car, thus avoiding the disagreeable feature found in nearly all cars now in use of cranking the car from the street, and the convenient arrangement of the steering gear with facility for moving it out of the way upon entering or leaving the car.

What I claim is:

1. In a motor driven vehicle, the combination of the steering wheels, and gas engine having a crank shaft, with the telescoping cranking shaft and steering post operatively connected with the engine crank shaft and steering wheels respectively, and a crank removably mounted upon said cranking shaft.

2. In a motor driven vehicle, the combination of the steering wheels, and the gas engine having a crank-shaft, with a cranking shaft operatively connected with the engine crank shaft, a tubular steering post fitting over and movable longitudinally upon said cranking shaft, an intermediate steering shaft operatively connected with said steering wheels, a worm gear upon said intermediate shaft, a worm wheel meshing with said worm gear, and splined upon said steering post, and a hand wheel upon said steering post.

3. In a motor driven vehicle, the combination of a body having a seat and a dashboard and a gas engine having a crank shaft, with a longitudinally extensible steering post mounted in horizontal position upon said vehicle and projecting across said dashboard, a hand wheel upon said steering post presented in convenient relation to said seat when said post or shaft is extended and presented against said dash board to afford free space in front of said seat when said post is retracted, a cranking shaft journaled in said extensible steering post and having driving connection with said engine crank shaft, and a removable crank upon said cranking shaft.

4. The combination, in a motor driven vehicle, of the steering wheels, an upright shaft operatively connected with said wheels, a worm gear upon said upright shaft, a worm wheel meshing with said worm gear, a horizontally mounted extensible steering post telescoping with and splined in said worm wheel, a gas engine having a crank shaft, a cranking shaft telescoping with said steering post and having driving connection with said engine crank shaft, and a hand crank removably mounted upon said cranking shaft.

BYRON C. RIBLET.

Witnesses:
 LAURA E. MONK,
 WM. E. KNIGHT.